United States Patent
Egli et al.

(10) Patent No.: US 10,934,712 B2
(45) Date of Patent: Mar. 2, 2021

(54) UNDERLAYMENT MEMBRANE

(71) Applicant: Profilitec S.p.A. Socio Unico, Isola Vicentina (IT)

(72) Inventors: Roderick Egli, Geneva (CH); Roberto Zaniol, Isola Vicentina (IT)

(*) Notice: Subject to any disclaimer, the term of this patent is extended or adjusted under 35 U.S.C. 154(b) by 0 days.

(21) Appl. No.: 16/609,338

(22) PCT Filed: May 8, 2018

(86) PCT No.: PCT/IB2018/053171
§ 371 (c)(1),
(2) Date: Oct. 29, 2019

(87) PCT Pub. No.: WO2018/207082
PCT Pub. Date: Nov. 15, 2018

(65) Prior Publication Data
US 2020/0190802 A1 Jun. 18, 2020

(30) Foreign Application Priority Data
May 8, 2018 (IT) .......................... 102017000049868

(51) Int. Cl.
*E04C 2/52* (2006.01)
*E04F 13/074* (2006.01)
(Continued)

(52) U.S. Cl.
CPC ............ *E04C 2/525* (2013.01); *E04F 13/074* (2013.01); *E04F 15/185* (2013.01); *F24D 3/142* (2013.01); *B32B 3/30* (2013.01); *Y10T 428/24479* (2015.01)

(58) Field of Classification Search
CPC .......... E04C 2/525; E04C 2/521; F24D 3/142; E04F 13/074; E04F 15/185; Y10T 428/24479; B32B 3/30
See application file for complete search history.

(56) References Cited

U.S. PATENT DOCUMENTS

| 4,326,366 A * | 4/1982 | Werner .................. F24D 3/142 52/220.3 |
| 2016/0047131 A1 | 2/2016 | Larson |

FOREIGN PATENT DOCUMENTS

| DE | 20013462 | 12/2001 |
| DE | 3317131 | 10/2014 |

(Continued)

OTHER PUBLICATIONS

English translation of applicant cited reference DE3317131 (Year: 1984).*

*Primary Examiner* — Donald J Loney
(74) *Attorney, Agent, or Firm* — Themis Law

(57) ABSTRACT

An underlayment membrane between a base surface and an outer coating of a building surface includes a base layer and multiple protrusions extending from the base layer to retain conditioning elements. The protrusions define a plurality of paths, between their side walls for the conditioning elements, which include: first straight portions defined by pairs of protrusions positioned side by side and spaced apart by a distance at most equal to the thickness of the conditioning elements, to hold them by friction; one or more second corrugated portions defined by two or more protrusions spaced apart by a predefined distance greater than the thickness of the conditioning elements and arranged in pairs aligned along lines, which obliquely intersect the path so that a conditioning element is retained by elastic-mechanical contrast with the side walls of the protrusions, the first and second portions of the paths being aligned with each other.

10 Claims, 2 Drawing Sheets

(51) Int. Cl.
*E04F 15/18* (2006.01)
*F24D 3/14* (2006.01)
*B32B 3/30* (2006.01)

(56) References Cited

FOREIGN PATENT DOCUMENTS

DE 202014008401 10/2014
EP 1462727 9/2004

* cited by examiner

UNDERLAYMENT MEMBRANE

DEFINITIONS

In the present invention the term "conditioning elements" refers to typically thread-like or tubular elements for electrical or fluid conduction intended to condition the building in which they are inserted.

In particular, conditioning is not to be intended as limited to features such as environmental temperature and moisture, but also to different features such as, for example, the creation of electromagnetic barriers for the protection of the building, light fixtures under wall, installation of underground utilities or other.

FIELD OF APPLICATION

The present invention is applicable to the building industry and its object in particular is an underlayment membrane between the base and the outer coating of a wall, a ceiling or a floor of a building.

More in detail, the present invention refers to a membrane suitable for retaining conditioning elements.

As previously mentioned, the most immediate application is the realization of heat radiating surfaces, but it should not be considered limiting for different applications such as the realization of light surfaces, electromagnetically insulating walls or other.

BACKGROUND ART

It is known, in the building industry, the use of rigid, semi-rigid or flexible underlayment membranes between the base of a building and the outer coating. Therefore, these membranes are indifferently used for the realization of floors, side walls and ceilings of interiors or other types of buildings.

It is also known the realization of walls, ceilings or radiating floors for the heating of interiors replacing the most common radiators in order to improve the aesthetic effect of the same interiors and to guarantee, at the same time, more uniform comfortable conditions. Other types of side walls are those provided with appropriate materials for electromagnetic shielding, for the diffusion of light or other.

In the case of heat radiating walls, it is known the use of said membranes as a supporting structure and holding in position of electric or hydraulic heating elements in order to produce the radiating surface. In order to do this, the known membranes comprise multiple protrusions emerging from the membrane to define suitable spaces between them for receiving the heating elements and to hold them typically by friction with their side walls or with appropriate projections realized on the same side walls. In other words, the protrusions identify paths in which the heating elements are jointly inserted and held there by friction.

Since, obviously, the position of the protrusions is fixed, it is clear that the correct joint is ensured exclusively for heating elements having a predefined section. Subsequently, in the case of heating elements of different cross-section, it is necessary to provide for the production of membranes with spaced protrusions having different distances.

This forces the production of multiple membranes having the same aesthetic design, but that are distinguished by the distance between the protrusions. The number of such membranes is, moreover, identical to the number of heating elements having a different section.

Another drawback is that the storage management of such membranes is also complex, since it has to provide multiple different membranes suitable for each heating element.

A further drawback is that the installer cannot simultaneously use different heating elements for the radiating surface, thus preventing a more specific management of the emitted heat.

At the same time, another drawback is constituted by the fact that an installer has great difficulty in positioning on the same membrane conditioning elements of different use such as, for example, elements capable of constituting an electromagnetic barrier. In such cases, in fact, it is even more probable for the conditioning elements to have a different cross section and are therefore incompatible with each other and with the chosen membrane.

Presentation of the Invention

The object of the present invention is to overcome at least partially the above mentioned drawbacks outlined by providing an underlayment membrane between the base and the outer coating of a wall, a ceiling or a floor of a building that allows the simultaneous use of air conditioning elements of different sections between each other.

Another object is that the membrane of the invention allows to reduce production costs with respect to what happens with known equivalent membranes.

A further object is that the membrane of the invention allows to reduce also the storage management costs with respect to what happens with known equivalent membranes.

Another object is that the membrane of the invention allows the installer to have greater freedom of choice in the use of conditioning elements having a different cross-section to provide the same building surface with respect to what happens with known equivalent membranes.

In other words, an object of the present invention is to provide an underlayment membrane which allows to realize multi-function surfaces, i.e. being at the same time, for example, temperature conditioners, light emitters and/or electromagnetic waves shielding.

Said objects, as well as others which will be better understood below, are achieved by an underlayment membrane between the base and the outer coating of a wall, a ceiling or a floor of a building, according to the following claims that are meant to be considered as integral of the present invention.

In particular, it comprises at least one base layer and a plurality of protrusions which rise from the base layer to retain air-conditioning elements which can be used, for example, to produce a heat radiating surface or an electromagnetic waves shielding surface.

According to an aspect of the invention, the protrusions define, among their own side walls, a first plurality of paths for the conditioning elements.

According to a further aspect of the invention, at least one of such paths comprises first straight portions defined by pairs of protrusions positioned side by side and spaced apart by a predefined distance at most equal to the thickness of the conditioning elements to hold them by friction.

In other words, the aforesaid pairs of protrusions have the side walls spaced apart from each other by a distance equal to the thickness of the conditioning elements. This allows to insert in the path said conditioning elements which are held there by friction with the side walls of the protrusions. The side walls can be shaped in any way as long as in at least one point they realize the aforesaid friction to hold the conditioning element in position.

According to another aspect of the invention, the same paths also comprise second corrugated portions defined by two or more protrusions spaced apart by a predefined distance greater than the thickness of the conditioning elements and arranged in pairs aligned along lines that obliquely intersect the path.

Furthermore, the first and second strokes are aligned with each other.

In other words, the protrusions defining the second portions are not aligned and aligned along horizontal or vertical axes, but aligned along axes obliquely intersecting the path of the conditioning element and are spaced by a distance greater than the thickness of the conditioning element. They are also arranged so that the conditioning element cannot be arranged straight between each other, but as to be shaped in a corrugated manner. It is therefore arranged to contrast on one side with the side wall of a first protrusion and subsequently on the other side with the side wall of a second protrusion.

In this way, the conditioning element is not held by friction between two protrusions that act simultaneously on the same section of the conditioning element, but due to the mechanical contrast that is exerted between the conditioning element and the side walls of the protrusions due to the springback of the conditioning element which, arranged according to a corrugated portion, tends to return straight.

Advantageously, such second portion allows to correctly retain a wide range of conditioning elements having different sections between them.

Still advantageously, therefore, while the first portion allows to correctly retain only one conditioning element having a specific section, the second portion allows the membrane to also retain conditioning elements of different cross-section.

Still advantageously, therefore, it is possible to decrease, in production, the number of membranes by type of conditioning elements. This, again advantageously, also improves the stock management of such membranes.

Advantageously, the installer has a good degree of freedom in choosing the conditioning elements to be installed with the membrane itself, since it can simultaneously use conditioning elements of different cross-sections also, but not only, to realize multi-function surfaces, for example conditioning the internal temperature, light emitters and/or electromagnetic waves shielding.

It is also noted that in the known art, the conditioning elements are often arranged as a serpentine on the membrane. The bendings are for angles of 90° or 180° and are very dry, thereby subjecting the conditioning elements to intense mechanical stress. In the case of the membrane of the invention, on the other hand, the arrangement of the protrusions on the second portions also allows paths that favour smoother bending angles, protecting the mechanical seal of the conditioning elements.

BRIEF DESCRIPTION OF THE DRAWINGS

Further features and advantages of the invention will be more apparent in light of the detailed description of a preferred, but not exclusive, embodiment of an underlayment membrane between a base surface and an outer coating of a wall, a ceiling or a floor of a building, according to the invention, illustrated by way of non-limiting example with the aid of the accompanying drawing tables, wherein.

Figure 1:
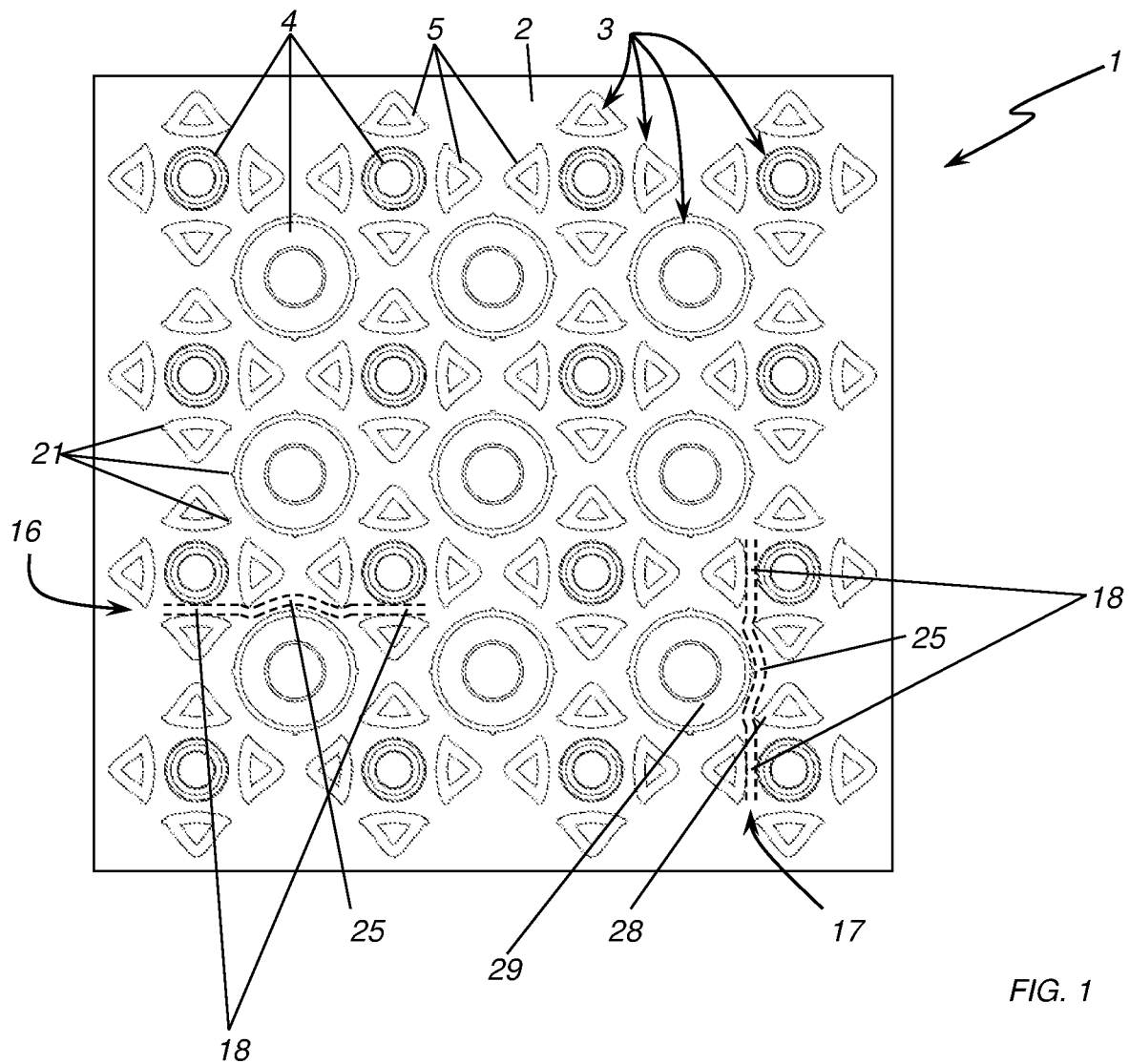
FIG. 1 depicts a front view of an underlayment membrane according to the invention.
Figures 2A, 2B, 2C:
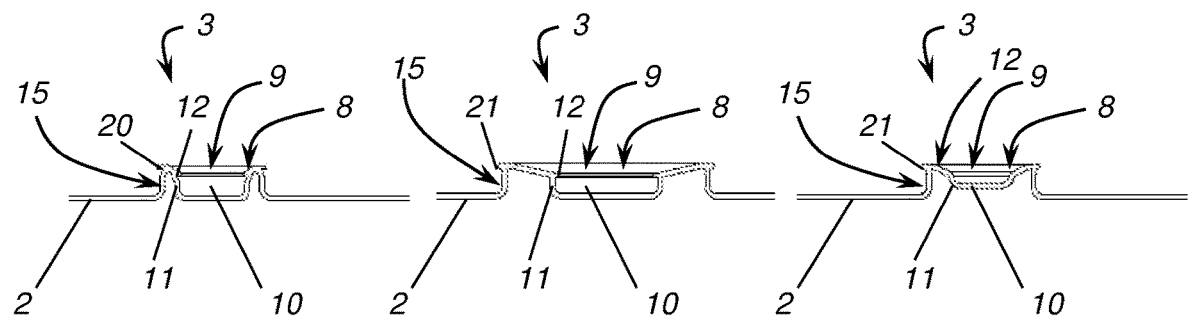
Figure 3:
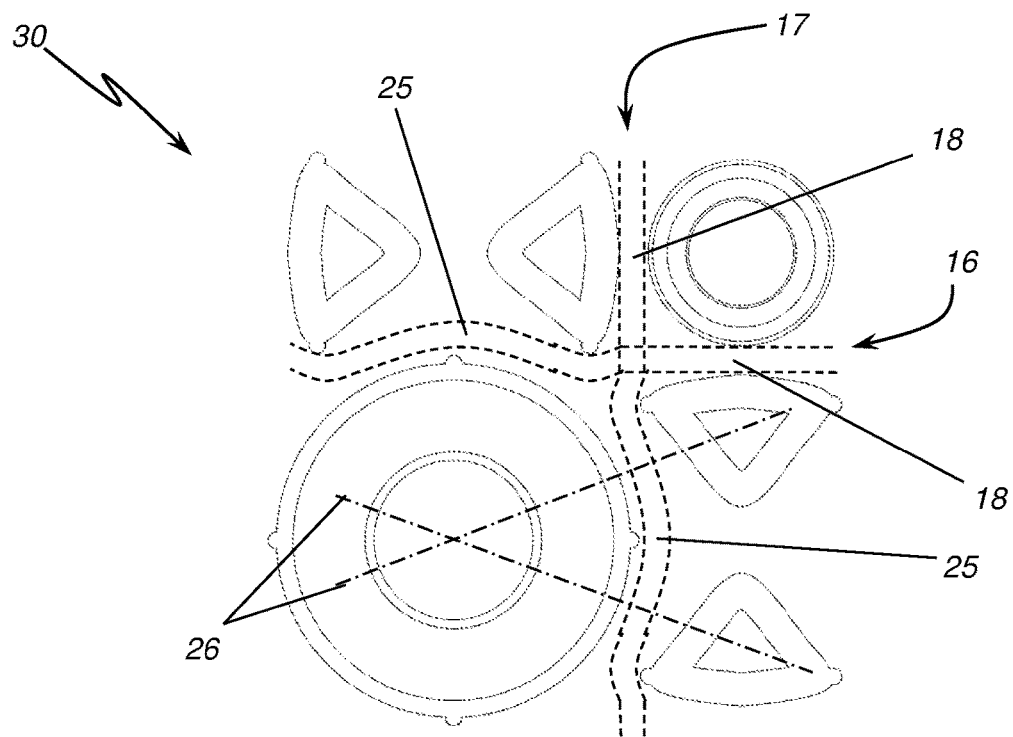

the sequence of FIGS. 2a to 2c represents some details of the membrane of FIG. 1 in section;

FIG. 3 depicts further details of the membrane of FIG. 1.

DETAILED DESCRIPTION OF SOME PREFERRED EMBODIMENT EXAMPLE

With reference to the cited figures, and in particular to FIG. 1, an underlayment membrane is described 1 between a base surface and an outer coating of a surface of a building. Such surface is typically constituted by a wall, ceiling or floor of a room, but this should not be considered limiting for the invention.

As for the known membranes, the membrane 1 of the invention comprises a base layer 2 and multiple protrusions 3 which rise from the base layer 2 to retain conditioning elements. The latter can be used for various purposes such as, for example, the creation of heat radiating surfaces or at least surfaces conditioning the room temperature, electromagnetic barriers for the protection of the building, under wall light fixtures, specialized walls for the installation of underground utilities or other.

According to an aspect of the invention, as shown in the figures, there are first protrusions 4 having the projection in a circular shaped plan, while second protrusions 5 have the projection in a substantially triangular shaped plan. Although this detail makes it possible to obtain specific advantages, as it is shown below, it must not be considered as limiting for the inventions, protrusions being possible to have in plan projection with any desired shape.

However, observing the figures, it should immediately be noted that this allows to realize protrusions 3 of particularly small dimensions and, arranging them according to a repetitive geometric pattern, allowing the installer to vary the centre distance between the paths at will so as to modulate the arrangement of the conditioning elements according to his own needs.

According to another aspect of the invention, the same protrusions 3, as it is shown in the detail of FIGS. 2a-2c wherein the three types of protrusions made in the described embodiment are shown in section, having on the upper surface 8 an opening 9 for the access to a central cavity 10. This allows, advantageously, the hooking of the adhesive or the like which retains the outer coating on the membrane 1. Obviously, also this aspect must not be considered limiting for the invention, the central cavities being totally absent or realized only on some protrusions. Also the shaping of the cavities can be anyone without any limit for the invention.

In particular, in such central cavities 10, on the inner side wall 11, there is an annular projection 12 recessing towards the inside of the central cavity 10 itself. This allows to realize an annular undercut that increases the hooking of the glue or the like. However, even this aspect should not be considered limiting for the invention, the annular projection may be absent or develop for only one or more portions of the side wall of the cavity.

According to a further aspect of the invention, the protrusions 3 define, among their own side walls 15, a first plurality of paths 16 and 17 for the conditioning elements.

In the figures it is observed that such paths 16 and 17 comprise a first plurality of substantially horizontal paths 16 and a second plurality of substantially vertical paths 17 for the conditioning elements. However, such aspect must not be considered as limiting for the invention. In particular, the presence of horizontal and vertical paths must not be considered limiting for the invention. In fact, oblique paths can also coexist or be the only type of paths.

According to another aspect of the invention, in fact, such paths 16 and 17 comprise a succession of first straight portions 18 defined by pairs of protrusions 3 positioned side by side and spaced apart by a predefined distance at most equal to the thickness of the conditioning elements to hold them by friction.

In other words, as already mentioned above, the pairs of protrusions 3 have the side walls 15 spaced apart from each other by a distance which is at most equal to the thickness of the conditioning elements. This allows to insert in the path such conditioning elements which are held there by friction with the side walls 15 of the protrusions 3.

In the figures it is observed that such side walls 15 have on their upper limit a projection 20 which in some cases is annular, while in other cases it is constituted by a tooth 21 positioned at the points in which the conditioning element contrasts with the protrusion 3 and the retention action is needed.

However, even such aspect must not be considered as limiting for the invention. In particular, the side walls can be shaped in any way as long as in at least one point they realize the aforesaid friction to hold the conditioning element in position.

According to another aspect of the invention, the same paths 16 and 17 also comprise second corrugated portions 25 defined by two or more protrusions 3 spaced apart by a predefined distance greater than the thickness of the conditioning elements and arranged in pairs aligned to the lines 26 obliquely intersecting the path 16, 17.

In other words, the protrusions 3 defining the second portions 25 are not aligned and aligned along horizontal or vertical axes as occurs for the first portions 18, but aligned along axes which obliquely intersect the path of the conditioning element and spaced by a distance greater than the thickness of the conditioning element. They are also arranged so that the conditioning element cannot be arranged straight, but as to be shaped in a corrugated manner.

Such arrangement results in the fact that the conditioning element contrasts on one side with the side wall 15 of a first protrusion 28 and subsequently on the other side with the side wall 15 of a second protrusion 29.

In the figures it is observed that the protrusions 3 which define the second portions 25 are three and alternate from one side to the other of the path 16, 17. In particular, two protrusions are arranged aligned on one side of the second portion 25 and the third one is arranged on the other side of the second portion 25 in an intermediate position with respect to the first two. However, even this aspect must not be considered as limiting for the invention, the second corrugated portion can be defined by any number of protrusions.

Even the number of straight and corrugated portions can vary. In fact, what matters is for at least one of the paths to have at least one straight portion and at least one corrugated portion.

In any case, advantageously, in the corrugated portion 25 the conditioning element is not held by friction between two protrusions 3 that act simultaneously on the same section of the conditioning element, but due to the mechanical contrast that is exerted between the conditioning element and the side walls 15 of the protrusions 3 due to the springback of the conditioning element which, arranged according to a corrugated portion, tends to return straight.

Advantageously, such second portion 25 allows to correctly retain a wide range of conditioning elements having different sections between them.

Still advantageously, therefore, while the first portion 18 allows to correctly retain only one conditioning element having a specific section, the second portion 25 allows the membrane 1 to also retain conditioning elements of different cross-section.

Still advantageously, therefore, it is possible to decrease, in production, the number of membranes 1 by type of conditioning elements. This, again advantageously, also improves the stock management of the membranes 1 of the invention with respect to what happens in the prior art.

It is furthermore observed that the installer, advantageously, can freely choose to use conditioning elements with different cross-section at the same time in order to partialize the function that they have to perform (for example, the heat radiation emitted by the radiating surface) or in order to realize a multifunctional surface (for example, radiant and shielding at the same time).

Previously, it has also been noted that in the prior art the conditioning elements are often arranged as a serpentine on the membrane with bendings having angles of 90° or 180° and very sharp. In the case of the membrane 1 of the invention, as previously mentioned, the arrangement of the protrusions 3 on the second portions 25 also allows paths that favour smoother bendings, protecting the mechanical seal of the conditioning elements.

In the figures it is observed that the horizontal 16 and vertical 17 paths are all constituted by alternating the first 18 and second 25 portions. However, even such aspect must not be considered limiting for the invention, the combination of the portions in each single path (even if it is oblique) being possible to be any. In any case, in fact, for each path 16 and 17 there is however at least a first portion 18 and at least a second portion 25. Subsequently, any conditioning element of the range suitable for the membrane 1 will in any case be held in position at least by the second portions 25 if not even from the first portions 18.

However, it should be noted that the alternation of the first 18 and second 25 portions allows to define a protrusions matrix 30 as shown in FIG. 3 and that is repeated throughout the membrane 1 simplifying the embodiment phase. More in detail, said matrix 30 comprises a horizontal path 16 and a vertical path 17 each of which consists of an alternating succession of a first straight portion 18 and a second corrugated portion 25.

In light of the foregoing, it is understood that the underlayment membrane of the invention achieves all the prefixed purposes.

In particular, it allows the simultaneous use of conditioning elements having a different cross-section.

The production and also the storage management costs are thus reduced with respect to what happens with known equivalent membranes.

A closer look, shows that the membrane of the invention allows the installer to have greater freedom of choice in the use of conditioning elements having a different cross-section to provide the same building surface with respect to what happens with known equivalent membranes.

The invention may be subject to many changes and variations, which are all included in the appended claims. Moreover, all the details may furthermore be replaced by other technically equivalent elements, and the materials may be different depending on the needs, without departing from the scope of protection of the invention defined by the appended claims.

The invention claimed is:

1. An underlayment membrane between a base surface and an outer coating of a wall, a ceiling, or a floor of a building, said membrane (1) comprising:
   at least one base layer (2); and
   a plurality of protrusions (3) arising from said base layer (2) and configured to retain a conditioning element,
   wherein said protrusions (3) are arranged to define, between their side walls (15), a plurality of paths (16, 17) adapted to receive the conditioning element, and
   wherein at least one of said plurality of paths is adapted to retain said conditioning element by having:
   a plurality of first straight portions (18) defined, along a same direction, by first protrusions of said plurality of protrusions (3) that are positioned in facing relationship to be on opposite sides of said conditioning element and that are spaced apart by a predefined distance at most equal to a thickness of the conditioning element, so as to hold the conditioning element by friction; and
   one or more second arched portions (25) each positioned between two of the plurality of first straight portions (18) and defined by second protrusions (3) of said plurality of protrusions, said second protrusions being arranged in facing relationship along lines (26) that intersect obliquely said same direction and being spaced from each other by a predefined distance greater than the thickness of the conditioning element, so that the conditioning element is retained by elastic-mechanical contrast with one of the side walls (15) of one of said second protrusions (3).

2. The underlayment membrane according to claim 1, wherein one or more of said plurality of paths (16, 17) consist of an alternating succession of said first straight portions (18) and said second arched portions (25).

3. The underlayment membrane according to claim 1, wherein said second arched portions (25) consist of at least three second protrusions (3), of which the first two of said at least three second protrusions are arranged aligned on one side of one of said second arched portions (25), and a third one of said second protrusions is arranged on another side of said one of said second arched portions (25) in an intermediate position with respect to said first two of said at least three second protrusions.

4. The underlayment membrane according to claim 1, wherein one or more of said plurality of protrusions (3) are shaped as a projection of circular shape.

5. The underlayment membrane according to claim 1, wherein one or more of said plurality of protrusions (3) are shaped as a projection of triangular shape.

6. The underlayment membrane according to claim 1, wherein one or more of said plurality of protrusions (3) have, on the side walls (15), one or more projections (20, 21) to facilitate retention in said at least one of said plurality of paths (16, 17) of the conditioning element.

7. The underlayment membrane according to claim 1, wherein one or more of said plurality of protrusions (3) have, on an upper surface (8), an opening (9) for accessing a central cavity (10).

8. The underlayment membrane according to claim 7, wherein said central cavity has, on an internal side wall (11), an annular projection (12) falling towards an inside of said central cavity (10).

9. The underlayment membrane according to claim 1, wherein said plurality of protrusions (3) define a matrix (30) of protrusions (3), which is repeated for an entirety of said underlayment membrane (1).

10. The underlayment membrane according to claim 9, wherein said matrix (30) comprises the at least one of said plurality of paths (16, 17) comprising the plurality of said first straight portions (18) and the one or more second arched portions (25).

* * * * *